(12) United States Patent
Chang et al.

(10) Patent No.: US 11,921,947 B2
(45) Date of Patent: Mar. 5, 2024

(54) ELECTRONIC SYSTEM AND TOUCH SENSITIVE PROCESSING APPARATUS FOR TOUCH FUNCTION SETTING AND ACTIVATING AND METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW); Chia-Ling Sun, Taipei (TW); Jia-Ming Chen, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/674,862

(22) Filed: Feb. 18, 2022

(65) Prior Publication Data

US 2022/0269367 A1 Aug. 25, 2022

Related U.S. Application Data

(60) Provisional application No. 63/151,083, filed on Feb. 19, 2021.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

2015/0227282 A1* 8/2015 Oh .......................... G06F 3/017
715/863
2016/0350548 A1* 12/2016 Lewis ................. G06F 3/04842

FOREIGN PATENT DOCUMENTS

| CN | 109542278 A | 3/2019 |
| CN | 111522498 A | 8/2020 |
| TW | 201528114 A | 7/2015 |

* cited by examiner

*Primary Examiner* — Stephen T. Reed
(74) *Attorney, Agent, or Firm* — WPAT, PC

(57) ABSTRACT

A touch function setting method is provided. The method comprising: receiving a sequence parameter which includes multiple clicks, each of the clicks is corresponding to one of areas of a touch panel or screen; receiving a function parameter corresponding to the sequence parameter, the function parameter is corresponding to activate a function; and storing a group of touch function parameters, which includes the sequence parameter and the function parameter.

14 Claims, 6 Drawing Sheets

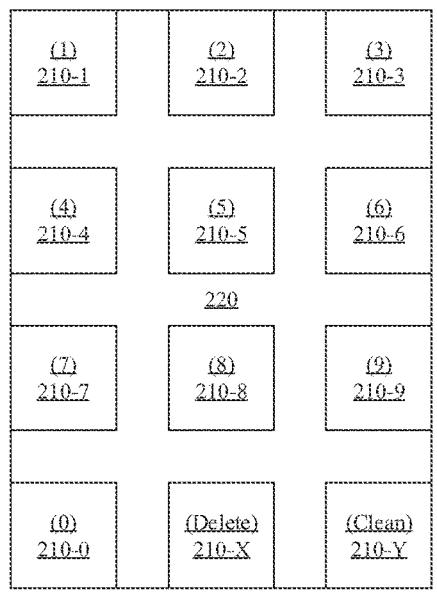
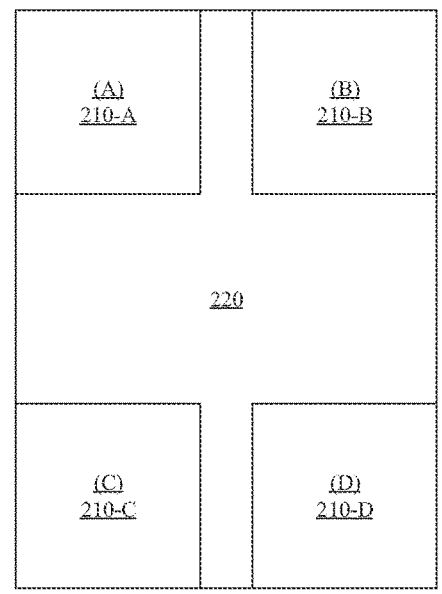
FIG. 2A
FIG. 2B

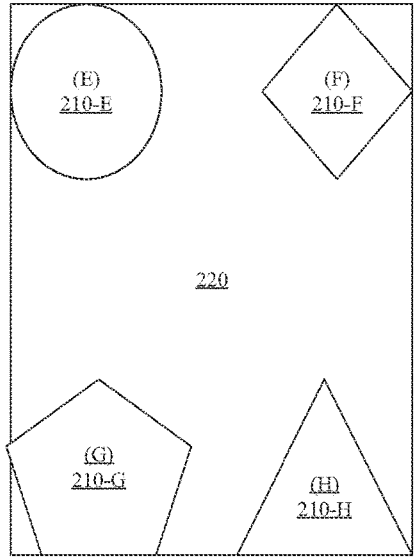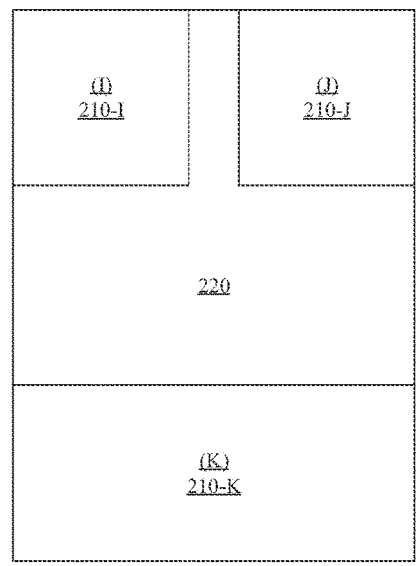
FIG. 2C
FIG. 2D

ELECTRONIC SYSTEM AND TOUCH SENSITIVE PROCESSING APPARATUS FOR TOUCH FUNCTION SETTING AND ACTIVATING AND METHOD THEREOF

CROSS REFERENCE TO RELATED PATENT APPLICATION

This patent application claims benefits of a U.S. provisional patent application No. 63/151,083 filed on Feb. 19, 2021.

FIELD OF THE INVENTION

The present invention relates to touch sensitive function, and more particularly, to handling of touch gestures.

BACKGROUND OF THE INVENTION

Touch screen or panel is one of common input and output interfaces of modern electronic systems. When a user wants to activate a particular function of the electronic system via the touch screen or panel, an application controlling the function must be shown on the touch screen or a screen with no touch function at first, then the user touches the touch screen or panel to command the application for activating the function. However, if the user does not want to activate the application, the function cannot be activated. Hence, a problem the present application tries to solve is to activate a particular function via a touch screen or panel without showing an application on screen.

SUMMARY OF THE INVENTION

According to one embodiment of the present application, a touch function setting method is provided. The method comprising: receiving a sequence parameter which includes multiple clicks, each of the clicks is corresponding to one of areas of a touch panel or screen; receiving a function parameter corresponding to the sequence parameter, the function parameter is corresponding to activate a function; and storing a group of touch function parameters, which includes the sequence parameter and the function parameter.

According to an embodiment of the present application, an electronic system for touch function setting is provided. The electronic system comprising: at least one input device; a memory; and a central processing unit (CPU) which is configured to execute instructions stored in non-volatile memory for: receiving, from the at least one input device, a sequence parameter which includes multiple clicks, each of the clicks is corresponding to one of areas of a touch panel or screen; receiving, from the at least one input device, a function parameter corresponding to the sequence parameter, the function parameter is corresponding to activate a function; and storing, to the memory, a group of touch function parameters, which includes the sequence parameter and the function parameter.

According to an embodiment of the present application, a touch function activating method is provided. The method comprising: receiving a touch event with regard to a touch panel or screen; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

According to an embodiment of the present application, an electronic system for touch function activating is provided. The electronic system comprising: a touch panel or screen; a touch sensitive processing apparatus coupled to the touch panel or screen; and a CPU coupled to the touch sensitive processing apparatus, the CPU is configured to execute instructions stored in non-volatile memory for: receiving a touch event with regard to the touch panel or screen from the touch sensitive processing apparatus; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

According to an embodiment of the present application, a touch sensitive processing apparatus for touch function activating is provided. The touch sensitive processing apparatus comprising: an interconnection network, connecting with touch electrodes of a touch panel or screen; a driving circuit connecting with the interconnection network; a sensing circuit connecting with the interconnection network; and a processor configured to execute instructions stored in non-volatile memory for: having the interconnection network, the driving circuit and the sensing circuit detect a touch event with regard to the touch panel or screen; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

The stealth touch mechanism provided by the present application is able to activate or to deactivate one or more functions via a touch panel or a touch screen when a program configured to activate or to deactivate the functions are not shown on screen, the user can operate the touch system stealthy and quickly and is carefree about revealing the operating procedure regarding to the activation or the deactivation of the function on screen to bystanders. Besides, when other input/output devices of the touch system are occupied, a second user can help to activate or to deactivate the function via the unoccupied touch panel or touch screen by utilizing the stealth touch mechanism. Moreover, sequences corresponding to two or more functions may share an identical part. The user may use one sequence to activate or to deactivate two or more functions in order to shorten time duration for input.

BRIEF DESCRIPTION OF THE DRAWINGS

The advantages and spirit related to the present invention can be further understood via the following detailed description and drawings.

FIG. 2A depicts a diagram of multiple areas of a touch panel or screen 120 in accordance with an embodiment of the present application.

FIG. 2B depicts a diagram of multiple areas of a touch panel or screen 120 in accordance with an embodiment of the present application.

FIG. 2C depicts a diagram of multiple areas of a touch panel or screen 120 in accordance with an embodiment of the present application.

FIG. 2D depicts a diagram of multiple areas of a touch panel or screen 120 in accordance with an embodiment of the present application.

DETAILED DESCRIPTION OF THE PREFERRED EMBODIMENT

Figure 1:
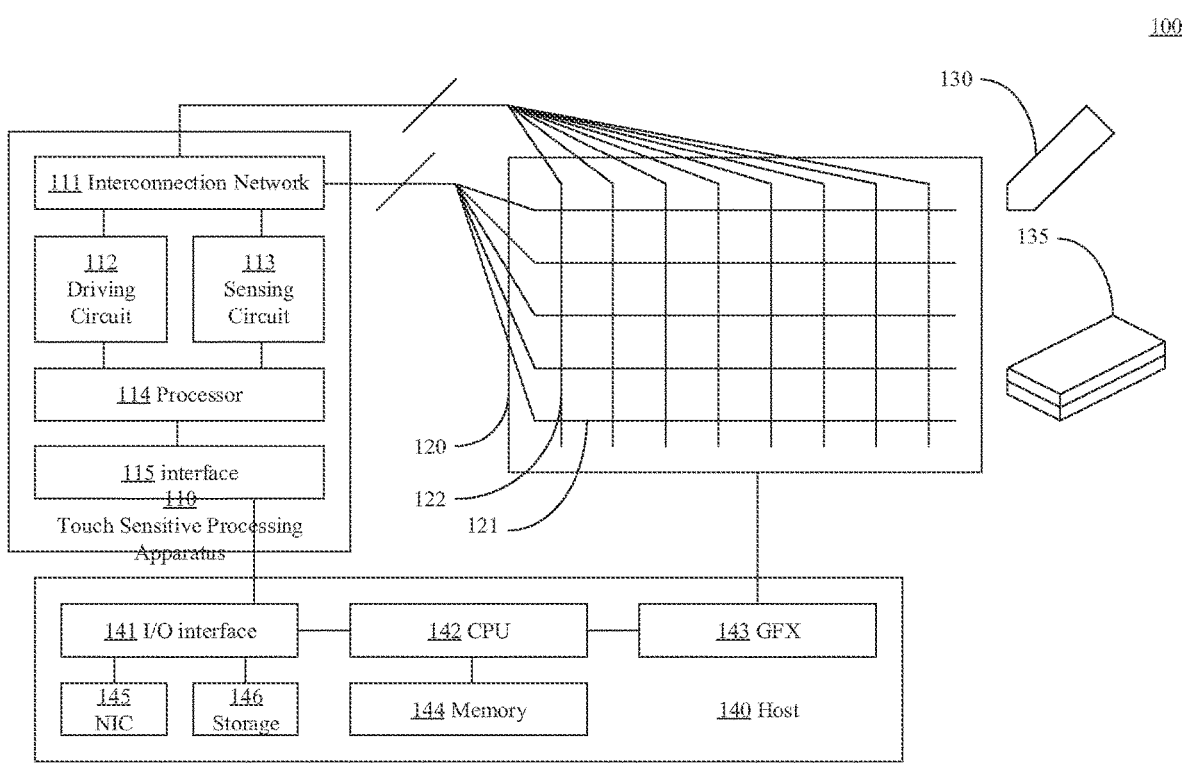
FIG. 1 shows a block diagram of a touch system 100 according to an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch system 100 according to an embodiment of the present invention. The touch system 100 may be a computer system such as a desktop computer, a laptop computer, a tablet computer, an industrial control computer, a smartphone or any other kinds of computer having touch sensitive function.

The touch system 100 may comprise a touch sensitive processing apparatus 110, a touch panel or screen 120 coupled to the touch sensitive processing apparatus 110, and a host coupled to the touch sensitive processing apparatus 110. The touch system 100 may further comprises one or more styli 130 and/or touch board eraser 135. Hereinafter the touch panel or screen 120 is referred as the touch screen 120. However, in the embodiments lacking of display function, persons having ordinary skill in the art can understand the touch screen denoted in the present application may be referred to a touch panel.

The touch screen 120 may comprise multiple first electrodes 121 in parallel to a first axis and multiple second electrodes 122 in parallel to a second axis. The first electrodes 121 may intersect with the second electrodes 122 in order to form multiple sensing points or sensing areas. Equivalently, the second electrodes 122 may intersect with the first electrodes 121 in order to form multiple sensing points or sensing areas. In some embodiments of the present application, the first electrodes 121 may be referred as first touch electrodes 121 and the second electrodes 122 may be referred as second touch electrodes 122. The first electrodes 121 and the second electrodes 122 may be collectively referred as touch electrodes. In some embodiments with touch screens 120, the first electrodes 121 and the second electrodes 122 are made by transparent material. The first electrodes 121 and the second electrodes 122 may be disposed in one electrode layer. Conductive plates of each one of the first electrodes 121 or the second electrodes 122 may be connected by bridging. The first electrodes 121 and the second electrodes 122 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 120.

The touch sensitive processing apparatus 110 may comprise following hardware circuit: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 100 may be implemented in single integrated circuits with the host 140. The present application does not limit how to implement the touch sensitive processing apparatus 110.

The interconnection network module 111 is configured to connect each of the multiple first electrodes 121 and/or the multiple second electrodes 122 of the touch screen 120. The interconnection network module 111 may follow control command of the processor module 114 for connecting the driving circuit module 112 and any one or more touch electrodes and for connecting the sensing circuit module 113 and any one or more touch electrodes. The interconnection network module 111 may include a combination of one or more multiplexers (MUX) to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 313 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I$^2$C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 120 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects 139 such as fingers, palms, or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120, and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage 146 module connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other circuits of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Please refer to FIG. 2A, which depicts a diagram of multiple areas of a touch panel or screen 120 in accordance with an embodiment of the present application. The touch panel or screen 120 may have a plurality of non-overlapped areas 210. A corresponding symbol may be assigned to each area as a code of the area. For example, in the embodiment as shown in FIG. 2A, there are twelve areas 210. They are areas 210-0 through 210-9, 210-X and 210-Y. There may be one or more "don't care" areas 220 configured to separate the areas 210 of the touch panel or screen 120. The present application does not require that there must have a "don't care" area 220 to separate the areas 210. The touch panel or screen 120 may comprise no "don't care" area 220. Any one of the areas 210 is adjacent to at least one of the areas 210.

In the embodiment as shown in FIG. 2A, numbers 0 through 9 are assigned to the ten areas 210-0 through 210-9, respectively. Besides, the area 210-X is an area representative of deleting a previous input. Another area 210-Y is an area representative of deleting all previous inputs or resetting.

A user may configure a sequence of input areas in advanced and a function corresponding to the sequence. For example, when the user sequentially clicks ten times in areas corresponding to a sequence of "0246813579", the touch sensitive processing apparatus 110 may suspend reporting touch events in three minutes. During this period, the touch sensitive processing apparatus 110 does not transmit any touch events to the host 140 of the touch system 100.

Hence, no matter what displays on the touch screen 120, as long as the user clicks continuously in areas 210-0, 210-2, 210-6, 210-8, 210-1, 210-3, 210-5, 210-7 and 210-9, the touch sensitive processing apparatus 110 would suspend reporting touch events in three minutes. In one embodiment, the ten touch events corresponding to the ten clicks would be transmitted to the host 140 of the touch system 100. The operating system or the application executed by the host 14 would process the ten touch events as usual. However, after the ten touch events are processed, the function that suspend reporting touch events in three minutes would be activated.

In one embodiment, when the user clicks a wrong area, he may click the area 210-X to delete the input of the wrong area. For example, the user continuously clicks in areas 210-0, 210-2, 210-4, 210-6, 210-8, 210-9, 210-X, 210-1, 210-3, 210-5, 210-7 and 210-9. Since the click of the area 210-X deletes the click of the previous wrong area 210-9, the function that suspend reporting touch events in three minutes would be still activated.

In one embodiment, if the user wants to reset the clicks or to restart the clicks, he may click the area 210Y such that all previous inputs of touch event would be reset or forgotten. Although there are areas 210-X and 210-Y in the embodiment as shown in FIG. 2A, the present application does not require that the touch panel or screen 120 must have these two kinds of special purposed areas.

Please refer to FIG. 2B, which depicts a diagram of multiple areas of a touch panel or screen 120 in accordance with an embodiment of the present application. The touch panel or screen 120 as shown in FIG. 2B does not have an area for resetting or deleting previous inputted touch events. It simply only have four areas 210-A through 210-D.

Please refer to FIG. 2C, which depicts a diagram of multiple areas of a touch panel or screen 120 in accordance with an embodiment of the present application. In the embodiments as shown in FIGS. 2A and 2B, sizes and shapes of all areas are identical. However, in the embodiment as shown in FIG. 2C, sizes and shapes of all areas may be different. The present application does not limit sizes and shapes of each area 210.

Please refer to FIG. 2D, which depicts a diagram of multiple areas of a touch panel or screen 120 in accordance with an embodiment of the present application. In the embodiments as shown in FIG. 2D, the size of the area 210-K is obviously larger than the other two areas 210-I and 210-J.

In the embodiments as shown in FIGS. 2A through 2D, there are many areas located along the edges and around the corners of the touch panel or screen 120. This is due to be desired to have as many areas as possible. However, for some operating systems or applications, the edges or the corners may be preserved for special purposes. Thus, it may be avoided to arrange the areas along the edges and around the corners such that it may prevent the operating system or the application from acting unnecessary actions when processing the touch events.

Figure 3:
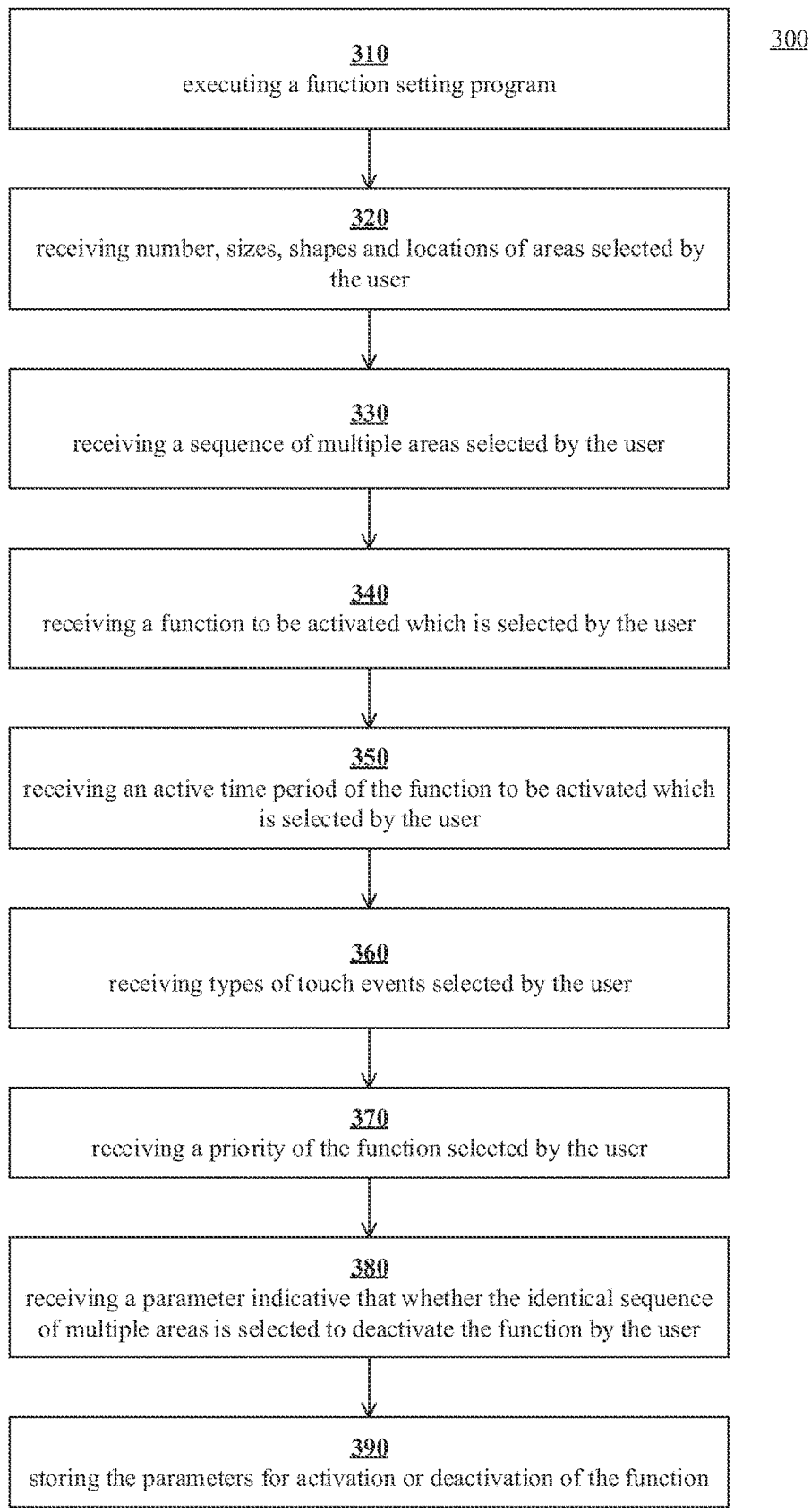
FIG. 3 illustrates a flowchart diagram of a stealth touch function setting method 300 in accordance with an embodiment of the present application.

Please refer to FIG. 3, which illustrates a flowchart diagram of a stealth touch function setting method 300 in accordance with an embodiment of the present application. The stealth touch function setting method 300 may be implemented by instructions stored in the non-volatile memory 144.

Step 310: executing a function setting program. This step shows a window or an area on a touch screen 120 or on a screen in order to receive parameters with regard to the stealth touch function from a user. In one embodiment, steps 330, 340 and 390 are mandatory. However, steps 320, 350, 360, 370 and 380 are optional. This application does not limit execution order of steps 320-380. It only requires that the steps 320-380 is executed before the step 380. In one embodiment, the user may input via the touch panel or screen 120 or may input parameters via any other input devices such as mouse or keyboard.

Optional step 320: receiving number, sizes, shapes and locations of areas selected by the user. As shown in FIGS. 2A-2D, the touch panel or screen 120 may include multiple areas. The size, the shape and the position of each area are adjustable. And each area may have corresponding code or symbol. In one embodiment, the number, sizes, shapes and positions may be fixed, non-adjustable. In one embodiment, there are three or more areas on the touch panel or screen 120. In one embodiment, the function setting program provides several default sets of areas to be chosen by the user.

Step 330: receiving a sequence of multiple areas selected by the user. For example, the forementioned sequence "0246813579" or the areas 210-0, 210-2, 210-4, 210-6, 210-8, 210-1, 210-3, 210-5, 210-7 and 210-9. In one embodiment, the sequence may include more than three areas. Since under normal operation, the user may coincidently click following the identical sequence to accidentally activate corresponding function. In order to prevent this kind of problems, it may require the number of areas in a sequence is larger than a positive integer.

Step 340: receiving a function to be activated which is selected by the user. For example, the function may be handled by the touch sensitive processing apparatus 110 such as a function of suspending reporting touch events, a function of suspending stylus 130, a function of suspending touch board eraser 135. In one embodiment, the function may be handled by the host 140 such as a function of entering a sleep mode and a function of switching to administrator login mode. In one embodiment, the aforementioned function is a function which can be handled by an operating system run on the host 140.

Optional step 350: receiving an active time period of the function to be activated which is selected by the user. For example, the time period of suspend reporting touch events is three minutes. For some functions, the active time period cannot be selected, or they can be permanently activated.

Optional step 360: receiving types of touch events selected by the user. In one embodiment, selectable types of touch events include one or any combination of following: finger, palm, stylus, touch board eraser, specified stylus, and specified touch board eraser. In a simpler embodiment, all clicks belong to one type of touch event. For example, it may require that all clicks are done by stylus. In another sophisticated embodiment, the clicks to various areas are required to be different types of touch events.

Optional step 370: receiving a priority of the function selected by the user. When more than two functions are set up, it is possible to have sequences corresponding to two functions share partial identical sequences. In an example, a sequence of a first function is "BCD", another sequence of a second function is "ABCD". When a user sequentially clicks "ABCD" which matches two sequences simultaneously, it is required to decide to activate which one of the first function or the second function. When the priority of the first function is higher than the priority of the second function, it may be prioritized to activate the first function. Reversely, when the priority of the second function is higher than the priority of the first function, it may be prioritized to activate the second function. In one embodiment, when these two functions do not conflict, the first function and the second function may be activated concurrently. That is the priorities of these two functions may be the same.

Optional step 380: receiving a parameter indicative that whether the identical sequence of multiple areas is selected to deactivate the function by the user. When the function selected at step 340 can be deactivated, the user may select to disable the function by using the identical sequence of multiple areas. For example, in case the selected function is to activate an LED light, when the LED light is turned on, it may use the identical sequence to deactivate the function, i.e., to turn off the LED light. In an alternative sequence, the step 380 is used to receive a parameter indicative that whether a reverse sequence of multiple areas is selected to deactivate the function by the user. In case the function selected at step 340 is to increase brightness of the LED light, it may use a reverse sequence to decrease brightness of the LED light. Because it is easier to memorize the identical sequence or the reverse sequence for the user, thus the user experience can be improved.

Step 390: after the parameters are selected at steps 320-380, storing the parameters for activation or deactivation of the function at this step. For example, when the corresponding function can be handled by the touch sensitive processing apparatus 110, the parameters corresponding to the function may be stored in a memory coupled to the processor 114. When the corresponding function can be executed by an operating system, the parameters corresponding to the function may be stored in the memory 144. When it is selected to deactivate the function using a reverse sequence of multiple areas at step 380, this reverse sequence is viewed as a new sequence for deactivating the function at step 390 which stores the new sequence and its corresponding parameters. In other words, this step stores more than one groups of touch function parameters. Each group of touch function parameters at least includes a sequence parameter received at step 330 and a function parameter received at step 340. Each group of touch function parameters may includes parameters corresponding to each areas.

Figure 4:
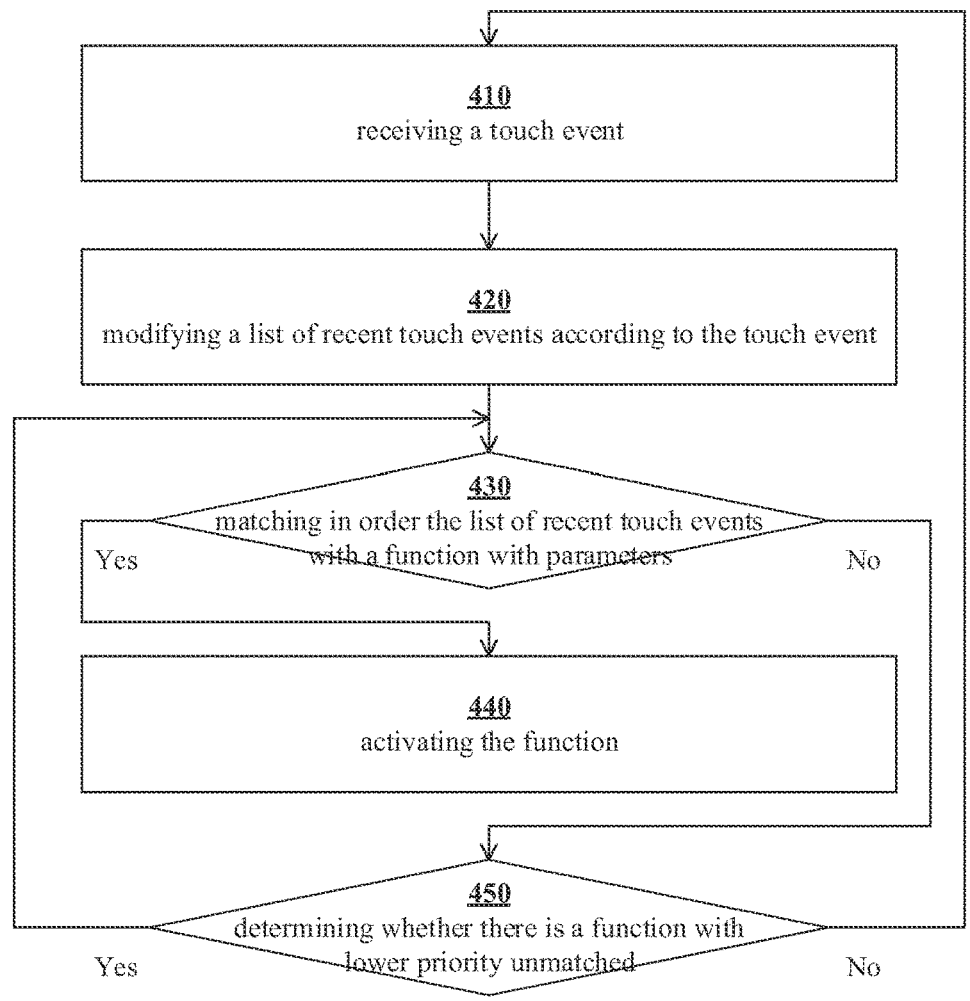
FIG. 4 depicts a flowchart diagram of a stealth touch function activating method 400 in accordance with an embodiment of the present application.

Please refer to FIG. 4, which depicts a flowchart diagram of a stealth touch function activating method 400 in accordance with an embodiment of the present application. In one embodiment, the processor 114 of the touch sensitive processing apparatus 110 may execute instructions to implement the stealth touch function activating method 400. In another embodiment, the CPU 142 of the host 140 may execute instructions to implement the stealth touch function activating method 400. In an alternative embodiment, the processor 114 and the CPU 142 may execute instructions to implement the stealth touch function activating method 400. In other words, the processor 114 is responsible to activate functions relative to the touch sensitive processing apparatus 110, and the CPU 142 is responsible to activate functions relative to the touch system 100. The touch sensitive processing apparatus 110 and/or the host 140 implementing the stealth touch function activating method 400 may retrieve the touch function parameter groups from memories.

Step 410: receiving a touch event. Via the touch electrodes of the touch panel or screen 120, the touch sensitive processing apparatus 110 may gather the touch event indicating that an external object approaching or touching the touch panel or screen 120. The touch event includes a location and/or a type. The touch event may reside in an area 210 or a "don't care" area 220. In one embodiment, when the touch event resides in a "don't care" area 220, the flow may return to step 410.

Step 420: modifying a list of recent touch events according to the touch event. When a longest sequence setup by the stealth touch function setting method 300 includes N areas, the list of recent touch events may include N touch events. For example, in case the longest sequence is "0246813579", the list of recent touch events may include 10 most recently occurring touch events. The list of recent touch events may be a queue (FIFO, first-in first out). When the number of touch events in the list is less than N, the most recently received touch event would be appended to the list. When the number of touch events in the list equals to N, the touch event at the head of the list would be deleted such that the most recently received touch event can be appended to the list. In the embodiment as shown in FIG. 2A, when the user clicks the area 210-X, the touch event at the tail of the list can be deleted. When the user clicks the area 210-Y, the list of recent touch events may be cleaned out or reset.

Step 430: matching in order the list of recent touch events with a function with parameters. Following the order of priorities of functions, determining whether the touch events in the list of recent touch events matches the sequence and the types of a function. In case it matches, the flow proceeds to step 440. Otherwise, the flow proceeds to step 450.

Step 440. when it matches to a function, activating the function. When the function includes a parameter of active time period, the function may be activated according to the active time period. When a parameter corresponding to the function indicating that the function is to be deactivated in case an identical sequence is received again and the function is already activated, step 440 deactivates the function instead. In one embodiment, two or more functions may be matched. These matched functions may be activated. In an alternative embodiment, only one of these matched functions with highest priority may be activated. After the matched function is activated, the list may be reset to empty in order to execute the stealth touch function activating method 400 from scratch.

Step 450: determining whether there is a function with lower priority unmatched. If there is at least one unmatched function, the flow returns to step 430. If all functions are processed, the flow returns to step 410.

Because it is not required to display an application on screen when the stealth touch function activating method 400 is executed, a particular function can be activated by touch input to a touch screen or panel.

Figure 5:
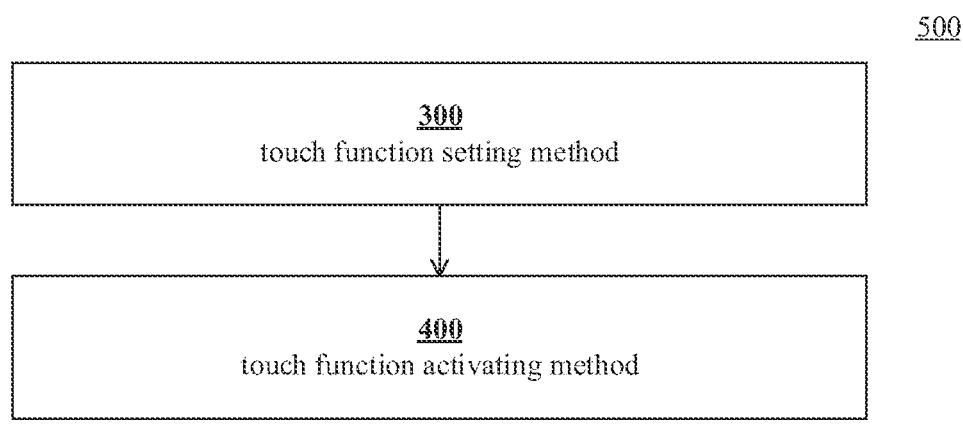
FIG. 5 depicts a flowchart diagram of a stealth touch method 500 in accordance with an embodiment of the present application.

Please refer to FIG. 5, which depicts a flowchart diagram of a stealth touch method 500 in accordance with an embodiment of the present application. The stealth touch method 500 includes two steps. The first step is the stealth touch function setting method 300 as shown in FIG. 3 and the second step is the stealth touch function activating method 400 as shown in FIG. 4. After the second step is done, the flow may repeat performing the second step. Since these two steps are discussed in the paragraphs regarding to FIGS. 3 and 4, no further description is elaborated.

The stealth touch mechanism provided by the present application is able to activate or to deactivate one or more functions via a touch panel or a touch screen when a program configured to activate or to deactivate the functions are not shown on screen, the user can operate the touch system stealthy and quickly and is carefree about revealing the operating procedure regarding to the activation or the deactivation of the function on screen to bystanders. Besides, when other input/output devices of the touch system are occupied, a second user can help to activate or to deactivate the function via the unoccupied touch panel or touch screen by utilizing the stealth touch mechanism. Moreover, sequences corresponding to two or more functions may share an identical part. The user may use one sequence to activate or to deactivate two or more functions in order to shorten time duration for input.

According to one embodiment of the present application, a touch function setting method is provided. The method comprising: receiving a sequence parameter which includes multiple clicks, each of the clicks is corresponding to one of areas of a touch panel or screen; receiving a function parameter corresponding to the sequence parameter, the function parameter is corresponding to activate a function; and storing a group of touch function parameters, which includes the sequence parameter and the function parameter.

Preferably, in order to have the user to designate an active time period of the function to be activated, the method further comprises receiving an active time period parameter corresponding to the function parameter, the group of touch function parameters includes the active time period parameter.

Preferably, in order to have the user freely configure the areas, the method further comprises receiving parameters of the areas, the group of touch function parameters includes the parameters of the areas, the parameters of the areas include one or any combination of following: number of the areas; size of each of the areas; shape of each of the areas; and position of each of the areas.

Preferably, in order to prevent the operating system which runs on the host mistaking clicks of the stealth touch function as gestures on the touch panel or screen, each one of the areas is not arranged along the edges or around the corners of the touch panel or screen.

Preferably, in order to enhance user experience on the stealth touch function, the method further comprises receiving a touch type parameter corresponding to each of the clicks, the group of touch function parameters includes the touch type parameter corresponding to each of the clicks, the touch type parameter includes one or any combination of following: finger, palm, stylus, touch board eraser; specified stylus; and specified touch board eraser.

Preferably, in order to prioritize multiple functions, the method further comprises receiving a priority parameter corresponding to the sequence parameter, the group of touch function parameter includes the priority parameter.

Preferably, in order to decrease the number of sequences the user needs to memorize, the method further comprises: receiving a parameter indicating whether the same sequence parameter is used to deactivate the function; and when the parameter indicating the same sequence parameter is used, configuring the function parameter to be corresponding to activate and to deactivate the function.

Preferably, in order to decrease the number of sequences the user needs to memorize, the method further comprises: receiving a parameter indicating whether a reverse sequence parameter is used to deactivate the function; and when the parameter indicating a reverse sequence parameter is used, storing a second group of touch function parameters which include a second sequence parameter and a second function parameter, a sequence of second clicks of the second sequence parameter is reverse to the sequence of the clicks, the second function parameter is corresponding to deactivate the function.

According to an embodiment of the present application, an electronic system for touch function setting is provided. The electronic system comprising: at least one input device; a memory; and a central processing unit (CPU) which is configured to execute instructions stored in non-volatile memory for: receiving, from the at least one input device, a sequence parameter which includes multiple clicks, each of the clicks is corresponding to one of areas of a touch panel or screen; receiving, from the at least one input device, a function parameter corresponding to the sequence parameter, the function parameter is corresponding to activate a function; and storing, to the memory, a group of touch function parameters, which includes the sequence parameter and the function parameter.

Preferably, in order to have the user to designate an active time period of the function to be activated, the CPU is further configured for receiving, from the at least one input device, an active time period parameter corresponding to the function parameter, the group of touch function parameters includes the active time period parameter.

Preferably, in order to have the user freely configure the areas, the CPU is further configured for receiving, from the at least one input device, parameters of the areas, the group of touch function parameters includes the parameters of the areas, the parameters of the areas include one or any combination of following: number of the areas; size of each of the areas; shape of each of the areas; and position of each of the areas.

Preferably, in order to prevent the operating system which runs on the host mistaking clicks of the stealth touch function as gestures on the touch panel or screen, each one of the areas is not arranged along the edges or around the corners of the touch panel or screen.

Preferably, in order to enhance user experience on the stealth touch function, the CPU is further configured for receiving, from the at least one input device, a touch type parameter corresponding to each of the clicks, the group of touch function parameters includes the touch type parameter corresponding to each of the clicks, the touch type parameter includes one or any combination of following: finger, palm, stylus, touch board eraser; specified stylus; and specified touch board eraser.

Preferably, in order to have the user freely configure the areas, the CPU is further configured for receiving, from the at least one input device, parameters of the areas, the group of touch function parameters includes the parameters of the areas, the parameters of the area include one or any combination of following: number of the areas; size of each of the areas; shape of each of the areas; and position of each of the areas.

Preferably, in order to prioritize multiple functions, the CPU is further configured for receiving, from the at least one input device, a priority parameter corresponding to the sequence parameter, the group of touch function parameter includes the priority parameter.

Preferably, in order to decrease the number of sequences the user needs to memorize, the CPU is further configured for: receiving, from the at least one input device, a parameter indicating whether the same sequence parameter is used to deactivate the function; and when the parameter indicating the same sequence parameter is used, configuring the function parameter to be corresponding to activate and to deactivate the function.

Preferably, in order to decrease the number of sequences the user needs to memorize, the CPU is further configured for: receiving, from the at least one input device, a parameter indicating whether a reverse sequence parameter is used to deactivate the function; and when the parameter indicating a reverse sequence parameter is used, storing, to the memory, a second group of touch function parameters which include a second sequence parameter and a second function parameter, a sequence of second clicks of the second sequence parameter is reverse to the sequence of the clicks, the second function parameter is corresponding to deactivate the function.

According to an embodiment of the present application, a touch function activating method is provided. The method comprising: receiving a touch event with regard to a touch panel or screen; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

Preferably, in order to have the user to designate an active time period of the function to be activated, the method further comprises activating the function in an active time period indicated by an active time period parameter of the matched group of touch function parameters.

Preferably, in order to have the user freely configure the areas, the group of touch function parameters includes parameters of the areas, the parameters of the areas include one or any combination of following: number of the areas; size of each of the areas; shape of each of the areas; and position of each of the areas.

Preferably, in order to prevent the operating system which runs on the host mistaking clicks of the stealth touch function as gestures on the touch panel or screen, each one of the areas is not arranged along the edges or around the corners of the touch panel or screen.

Preferably, in order to enhance user experience on the stealth touch function, the group of touch function parameters further includes a touch type parameter corresponding to each of the clicks, the touch type parameter includes one or any combination of following: finger, palm, stylus, touch board eraser; specified stylus; and specified touch board eraser.

Preferably, in order to execute the most prioritized one of multiple matched functions, the group of touch function parameters further includes a priority parameter corresponding to the sequence parameter, the method further comprises: when the list of recent touch events is matched to the sequence parameters of a plurality of the groups of touch function parameters, activating a function indicated by a function parameter of the matched group of touch function parameters with a higher priority parameter.

Preferably, in order to decrease the number of sequences the user needs to memorize, the method further comprises: when the function parameter is configured to be activated or to be deactivated, determining whether the function is activated or not; when the function is activated, deactivating the function; and when the function is not activated, activating the function.

Preferably, in order to decrease the number of sequences the user needs to memorize, the method further comprises: when the function parameter is configured to be deactivated, deactivating the function.

According to an embodiment of the present application, an electronic system for touch function activating is provided. The electronic system comprising: a touch panel or screen; a touch sensitive processing apparatus coupled to the touch panel or screen; and a CPU coupled to the touch sensitive processing apparatus, the CPU is configured to execute instructions stored in non-volatile memory for: receiving a touch event with regard to the touch panel or screen from the touch sensitive processing apparatus; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

Preferably, in order to have the user to designate an active time period of the function to be activated, the CPU is further configured for activating the function in an active time period indicated by an active time period parameter of the matched group of touch function parameters.

Preferably, in order to have the user freely configure the areas, the group of touch function parameters includes parameters of the areas, the parameters of the areas include one or any combination of following: number of the areas; size of each of the areas; shape of each of the areas; and position of each of the areas.

Preferably, in order to prevent the operating system which runs on the host mistaking clicks of the stealth touch function as gestures on the touch panel or screen, each one of the areas is not arranged along the edges or around the corners of the touch panel or screen.

Preferably, in order to enhance user experience on the stealth touch function, the group of touch function parameters further includes a touch type parameter corresponding to each of the clicks, the touch type parameter includes one or any combination of following: finger, palm, stylus, touch board eraser; specified stylus; and specified touch board eraser.

Preferably, in order to execute the most prioritized one of multiple matched functions, the group of touch function parameters further includes a priority parameter corresponding to the sequence parameter, the CPU is further configured for: when the list of recent touch events is matched to the sequence parameters of a plurality of the group of touch function parameters, activating a function indicated by a function parameter of the matched group of touch function parameters with a higher priority parameter.

Preferably, in order to decrease the number of sequences the user needs to memorize, the CPU is further configured for: when the function parameter is configured to be activated or to be deactivated, determining whether the function is activated or not; when the function is activated, deactivating the function; and when the function is not activated, activating the function.

Preferably, in order to decrease the number of sequences the user needs to memorize, the CPU is further configured for: when the function parameter is configured to be deactivated, deactivating the function.

According to an embodiment of the present application, a touch sensitive processing apparatus for touch function activating is provided. The touch sensitive processing apparatus comprising: an interconnection network, connecting with touch electrodes of a touch panel or screen; a driving circuit connecting with the interconnection network; a sensing circuit connecting with the interconnection network; and a processor configured to execute instructions stored in non-volatile memory for: having the interconnection network, the driving circuit and the sensing circuit detect a touch event with regard to the touch panel or screen; modifying a list of recent touch events according to the touch event, the list of recent touch events comprises multiple touch events recently received; matching a sequence parameter of multiple groups of touch function parameters with the list of recent touch events, the sequence parameter includes multiple clicks, each of the clicks is corresponding to one of areas of the touch panel or screen; and when the list of recent touch events is matched to the sequence parameter of one of the group of touch function parameters, activating a function indicated by a function parameter of the matched group of touch function parameters.

Preferably, in order to have the user to designate an active time period of the function to be activated, the processor is further configured for activating the function in an active time period indicated by an active time period parameter of the matched group of touch function parameters.

Preferably, in order to have the user freely configure the areas, the group of touch function parameters includes parameters of the areas, the parameters of the areas include one or any combination of following: number of the areas; size of each of the areas; shape of each of the areas; and position of each of the areas.

Preferably, in order to prevent the operating system which runs on the host mistaking clicks of the stealth touch function as gestures on the touch panel or screen, each one of the areas is not arranged along the edges or around the corners of the touch panel or screen.

Preferably, in order to enhance user experience on the stealth touch function, the group of touch function parameters further includes a touch type parameter corresponding to each of the clicks, the touch type parameter includes one or any combination of following: finger, palm, stylus, touch board eraser; specified stylus; and specified touch board eraser.

Preferably, in order to execute the most prioritized one of multiple matched functions, the group of touch function parameters further includes a priority parameter corresponding to the sequence parameter, the processor is further configured for: when the list of recent touch events is matched to the sequence parameters of a plurality of the group of touch function parameters, activating a function indicated by a function parameter of the matched group of touch function parameters with a higher priority parameter.

Preferably, in order to decrease the number of sequences the user needs to memorize, the processor is further configured for: when the function parameter is configured to be activated or to be deactivated, determining whether the function is activated or not; when the function is activated, deactivating the function; and when the function is not activated, activating the function.

Preferably, in order to decrease the number of sequences the user needs to memorize, the processor is further configured for: when the function parameter is configured to be deactivated, deactivating the function.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch function setting method, comprising:
    receiving a sequence parameter that includes a sequence of codes, each of the codes corresponding to selection of one of a set of separated, non-overlapping, and distinct areas of a touch panel or screen;
    receiving a function parameter corresponding to the sequence parameter, the function parameter corresponding to activating a particular function; and
    after the sequence parameter and the function parameter are received, storing a group of touch function parameters, which includes the sequence parameter and the function parameter;
    wherein the set of separated, non-overlapping, and distinct areas of the touch panel or screen are configured by a user, the user specifying that the group of touch function parameters also includes a number of the areas and a size, shape, and position of each of the areas.

2. The touch function setting method as claimed in claim 1, further comprises receiving an active time period parameter corresponding to the function parameter, the group of touch function parameters includes the active time period parameter.

3. The touch function setting method as claimed in claim 1, wherein each one of the areas is not arranged along the edges or around the corners of the touch panel or screen.

4. The touch function setting method as claimed in claim 1, further comprises receiving a touch type parameter corresponding to each of the codes of the sequence parameter, the group of touch function parameters includes the touch type parameter corresponding to each of the codes of the sequence parameter, the touch type parameter includes one or any combination of following: finger, palm, stylus, touch board eraser; specified stylus; and specified touch board eraser.

5. The touch function setting method as claimed in claim 1, further comprises receiving a priority parameter corresponding to the sequence parameter, wherein the group of touch function parameter includes the priority parameter.

6. The touch function setting method as claimed in claim 1, further comprises:
receiving a parameter indicating whether the same sequence parameter is used to deactivate the function; and
when the parameter indicating the same sequence parameter is used, configuring the function parameter to be corresponding to activating and deactivating the function.

7. The touch function setting method as claimed in claim 1, further comprises:
receiving a parameter indicating whether a reverse sequence parameter is used to deactivate the function; and
when the parameter indicating a reverse sequence parameter is used, storing a second group of touch function parameters which include a second sequence parameter and a second function parameter, wherein a sequence of second codes of the second sequence parameter is reverse to the sequence of the codes, the second function parameter is corresponding to deactivating the function.

8. An electronic system for touch function setting comprising:
at least one input device;
a memory; and
a central processing unit (CPU) which is configured to execute instructions stored in non-volatile memory for:
receiving, from the at least one input device, a sequence parameter that includes a sequence of codes, each of the codes corresponding to selection of one of a set of separated, non-overlapping, and distinct areas of a touch panel or screen;
receiving, from the at least one input device, a function parameter corresponding to the sequence parameter, wherein the function parameter corresponding to activating a particular function; and
after the sequence parameter and the function parameter are received, storing, to the memory, a group of touch function parameters, which includes the sequence parameter and the function parameter;
wherein the set of separated, non-overlapping, and distinct of the touch panel or screen are configured by a user, the user specifying that the group of touch function parameters also includes a number of the areas and a size, shape, and position of each of the areas.

9. The electronic system as claimed in claim 8, wherein the CPU is further configured for receiving, from the at least one input device, an active time period parameter corresponding to the function parameter, the group of touch function parameters includes the active time period parameter.

10. The electronic system as claimed in claim 8, wherein each one of the areas is not arranged along the edges or around the corners of the touch panel or screen.

11. The electronic system as claimed in claim 8, wherein the CPU is further configured for receiving, from the at least one input device, a touch type parameter corresponding to each of the codes of the sequence parameter, the group of touch function parameters includes the touch type parameter corresponding to each of the codes of the sequence parameter, the touch type parameter includes one or any combination of following: finger, palm, stylus, touch board eraser; specified stylus; and specified touch board eraser.

12. The electronic system as claimed in claim 8, wherein the CPU is further configured for receiving, from the at least one input device, a priority parameter corresponding to the sequence parameter, the group of touch function parameter includes the priority parameter.

13. The electronic system as claimed in claim 8, wherein the CPU is further configured for:
receiving, from the at least one input device, a parameter indicating whether the same sequence parameter is used to deactivate the function; and
when the parameter indicating the same sequence parameter is used, configuring the function parameter to be corresponding to activating and deactivating the function.

14. The electronic system as claimed in claim 8, wherein the CPU is further configured for:
receiving, from the at least one input device, a parameter indicating whether a reverse sequence parameter is used to deactivate the function; and
when the parameter indicating a reverse sequence parameter is used, storing, to the memory, a second group of touch function parameters which include a second sequence parameter and a second function parameter, wherein a sequence of second codes of the second sequence parameter is reverse to the sequence of the codes, the second function parameter is corresponding to deactivating the function.

* * * * *